UNITED STATES PATENT OFFICE.

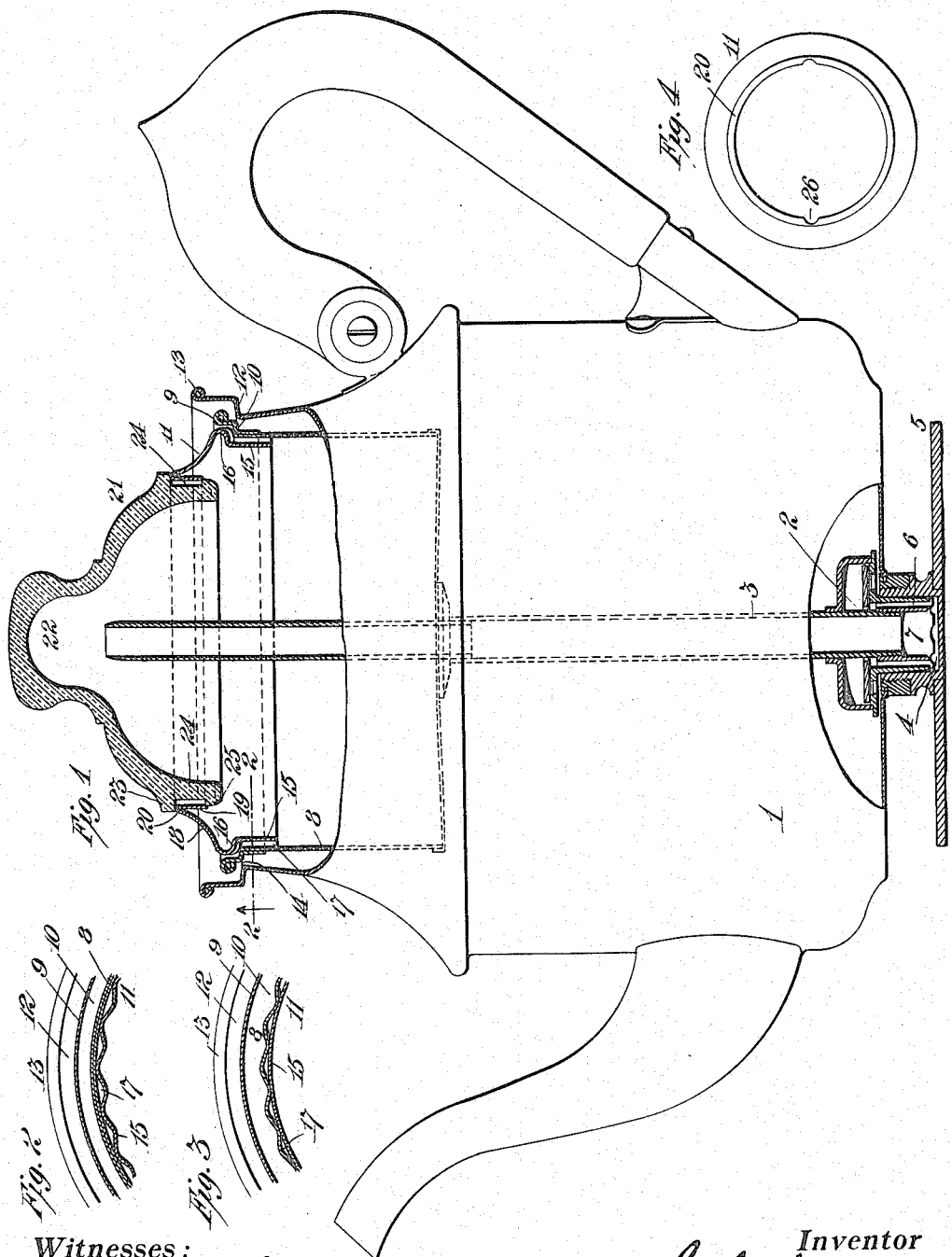

CHARLES NELSON, OF NEW YORK, N. Y., ASSIGNOR TO THE FIRM OF S. STERNAU & COMPANY, OF NEW YORK, N. Y., A COPARTNERSHIP COMPOSED OF SIGMUND STERNAU AND LIONEL STRASSBURGER.

COFFEE-MACHINE.

1,122,298. Specification of Letters Patent. Patented Dec. 29, 1914.

Application filed April 3, 1908. Serial No. 424,868.

*To all whom it may concern:*

Be it known that I, CHARLES NELSON, a subject of the King of Sweden, and a resident of the borough of Brooklyn, county of Kings, city and State of New York, have invented a new and useful Improvement in Coffee-Machines, (Case L,) of which the following is a specification.

The object I have in view is the production of a machine for making coffee, or infusions of coffee, tea or other substances for producing beverages and for analogous purposes, such apparatus having means to prevent the washing of the coffee-grounds into the receptacle in the event that an overflow is caused by too vigorous action of the fountain. These and other objects will appear from the following specification and accompanying drawing, considered together or separately.

Figure 1 is a view, partly in section, of a coffee-pot embodying the invention. Fig. 2 is a section on the line 2—2 of Fig. 1 looking upward. Fig. 3 is a similar view of a modification; and Fig. 4 is a plan view, on a reduced scale, of the cover annulus.

In all of the views like parts are designated by the same reference characters.

The invention is illustrated as embodied in the form of a coffee-pot, but it is to be understood that any other form of coffee machine or similar device may be used in connection with the invention.

The structure illustrated comprises a receptacle 1 for containing water and the infusion of coffee, or of whatever material is used for that purpose. In the receptacle 1 is a fountain 2, having an outlet tube 3. The fountain 2 is shown as extending into a heating chamber 4, provided with a plate 5, which serves as a foot for the coffee-pot, also a means for conducting heat to the heating chamber 4, and also for insulating the bottom of the receptacle 1 to keep its contents from being directly acted upon by the heat. The fountain is shown as provided with a plurality of inlet passages 6, grouped about a centrally located outlet passage 7. A valve prevents the passage of the liquid in the reverse direction, and insures that it shall pass downwardly through the inlet passages 6, and upwardly through the outlet passage 7. The particular form of fountain chosen for illustration forms the subject matter of an application for patent filed by me on the 30th day of October, 1907, Serial No. 399,804, (Case J). Any other form of fountain may be used, with or without the heating chamber 4.

The outlet tube 3 of the fountain passes through and is connected to and supports a screen 8 or receptacle for holding the coffee. This receptacle is of the cylindrical form shown, and has perforated side walls and an imperforate bottom. On the upper edge of the side walls is an outwardly extending flange 9, having a seat 10 for the support of the annulus 11. The flange 9, when the fountain is in place is about on the same horizontal plane as the flange 12, on the upper edge of the receptacle 1. This flange 12 extends outward, and connects at its outer edge with a vertical flange 13, shown with a beaded upper edge. The flange 9, when the outlet tube 3 is in the vertical position, serves as one wall of an annular passage 14, the other wall being formed by the inner edge of the flange 12. The width of this passage may be varied according to the extent of the opening desired to the interior of the receptacle 1. The flanges 12 and 13 constitute a flaring mouth to the receptacle 1.

The annulus 11 does not engage with the inner wall of the flange 9 but rests upon the seat 10. It is provided with a depending flange 15, which comes in contact with the inner wall of the screen 8. The flange 15 has an enlargement 16 which rests upon the seat 10. The flange, together with the enlargement 16, is crimpled or corrugated forming passages 17, which serve as a means of communication between the interior of the receptacle 8 and the flange 9. The portion of the annulus above the enlargement 16 extends inwardly, forming an incline 18. On the inner extremity of the annulus is a depending flange 19 connected to the inclined portion 18 by a short horizontal portion 20 (see Fig. 4). Within the opening of the annulus is supported a glass cap 21. This glass cap has a central recess 22 arranged to lie above the open outer end of the outlet tube 3. The cap 21 is provided with a horizontal flange 23 and a vertical flange 24. The flange 23 is adapted to rest upon the horizontal portion 20 of the annulus 11, while the vertical flange 24 is adapted to engage with the vertical flange 19 of such annulus. The cap 21 is secured to the annulus 11 by means of a bayonet joint formed of ears 25 on the glass engaging with the lower edge of the flange 19. The cap may be attached to the annulus by adjusting the parts so that the ears will lie within grooves 26 in the flange 19. By partly twisting the cap within the annulus, the ears may be caused to engage with the lower edge of the flange 19.

Fig. 3 shows a modified embodiment of the invention wherein the corrugations and passages 17 are formed in the sides of the screen 8. In this modification the flange 10 is made integral with the screen and not separate therefrom, as illustrated in Figs. 1 and 2.

The coffee or other material of which the infusion is to be made is placed within the screen 8, and water is placed within the receptacle 1. Heat being applied to the bottom of the fountain, the liquid will be drawn from the receptacle and discharged through the orifice of the fountain against the center of the cap 21 into the recess 22, and will be discharged downwardly upon the contents of the screen, and percolate through such contents and escape through perforations in the screen. Should the fountain act with greater vigor than normal, and discharge a greater amount of liquid through the orifice of the discharge tube 3 than can percolate through the contents of the screen 8, and the perforations in the latter, the surplus liquid will escape through the joint between the screen 8, seat 10 and the flange 15, and will be discharged over the flange 9 and enter the receptacle through the passage 14. This will occur without any possibility of solid coffee or coffee-grounds being carried into the receptacle, as the passages 17 are not large enough to allow this to happen. The flange 12 is sufficiently high so that the liquid discharged over the head 9 cannot escape outside of the receptacle but will be kept within the receptacle 1. By lifting out the screen 8, the fountain will come out with it, leaving the inside of the receptacle 1 entirely unobstructed and free for cleaning.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent is:

1. A coffee machine having a receptacle, in combination with a fountain, a screen having inclosing walls, and an annulus resting within the screen; means for holding the annulus separated from the screen and thereby forming an annular outlet passage between the annulus and the screen; and a cap lying within the annulus and forming a close joint therewith.

2. A coffee machine having a receptacle; a screen, having inclosing walls, within the receptacle; a cover for the screen, one of the contacting surfaces of the cover and the screen being formed of corrugations to provide a plurality of passages between the interior and exterior of the screen.

3. A coffee machine having a receptacle; a screen, having inclosing walls, within the receptacle; and a cover for the screen, said cover having a depending transversely corrugated flange forming a plurality of outlet passages from the screen.

This specification signed and witnessed this 31st day of March, 1908.

CHARLES NELSON.

Witnesses:
 LEONARD H. DYER,
 JOHN L. LOTSCH.